United States Patent
Heiberger et al.

(10) Patent No.: US 11,067,156 B1
(45) Date of Patent: Jul. 20, 2021

(54) FRICTION BRAKE AND POWER STRUT THEREWITH

(71) Applicant: Hi-Lex Controls, Inc., Rochester Hills, MI (US)

(72) Inventors: John Heiberger, Grand Blanc, MI (US); Favad Shah, Rochester Hills, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 0 days.

(21) Appl. No.: 16/934,104

(22) Filed: Jul. 21, 2020

(51) Int. Cl.
| | |
|---|---|
| F16D 51/04 | (2006.01) |
| F16H 25/24 | (2006.01) |
| F16D 13/52 | (2006.01) |
| F16H 25/20 | (2006.01) |

(52) U.S. Cl.
CPC ......... F16H 25/2454 (2013.01); F16D 13/52 (2013.01); F16D 51/04 (2013.01); F16H 25/20 (2013.01); F16H 2025/2075 (2013.01); F16H 2025/2463 (2013.01)

(58) Field of Classification Search
CPC ......... F16H 25/2454; F16H 2025/2463; F16H 2025/2075; F16H 25/20; F16D 13/52; F16D 51/04
See application file for complete search history.

(56) References Cited

U.S. PATENT DOCUMENTS

| | | | |
|---|---|---|---|
| 5,031,270 A | 7/1991 | Lee | |
| 7,028,573 B2 | 4/2006 | Inaba et al. | |
| 7,111,358 B1 * | 9/2006 | Jackson | E05F 1/1215 16/50 |
| 7,185,943 B2 | 3/2007 | Lesle et al. | |
| 7,900,530 B2 | 3/2011 | Bochen et al. | |
| 8,042,301 B2 * | 10/2011 | Ritter | E05F 5/00 49/343 |
| 8,403,397 B2 | 3/2013 | Adams et al. | |
| 9,021,905 B2 | 5/2015 | Reif | |
| 9,097,056 B2 | 8/2015 | Kummer et al. | |
| 9,567,786 B2 | 2/2017 | Buchheim et al. | |
| 9,590,467 B2 | 3/2017 | Heinze et al. | |
| 9,617,772 B1 * | 4/2017 | Chen | E05D 3/02 |

(Continued)

FOREIGN PATENT DOCUMENTS

| | | |
|---|---|---|
| EP | 3561336 A1 | 10/2019 |
| WO | 2019/185081 A1 | 10/2019 |

*Primary Examiner* — David M Fenstermacher
(74) *Attorney, Agent, or Firm* — Dickinson Wright PLLC

(57) ABSTRACT

A friction brake assembly includes a brake housing; an input coupling element; an output coupling element; and a torsion spring. The input coupling element has an axial protrusion forming a partial cylinder wall with an angular gap over a defined angular range. The output coupling element has a projection protruding into the at least one angular gap, wherein the projection has an angular width smaller than the angular gap; wherein the torsion spring is a coil spring with coil ends forming two radially inward pins protruding into the angular gap in the input coupling element between the partial cylinder wall and the projection so that the projection is between the two inward pins. The torsion spring has a diameter that expands to form a friction lock with a surrounding cylindrical wall when the projection of the output coupling element engages and moves either one of the inward pins.

17 Claims, 6 Drawing Sheets

(56) References Cited

U.S. PATENT DOCUMENTS

| | | |
|---|---|---|
| 10,119,599 B2 * | 11/2018 | Fischer .................. F16H 25/20 |
| 10,180,169 B2 | 1/2019 | Strobel |
| 10,280,674 B2 | 5/2019 | Leonard et al. |
| 10,428,572 B2 | 10/2019 | Oster et al. |
| 2006/0289821 A1 * | 12/2006 | Ritter .................... E05F 15/614 |
| | | 251/129.13 |
| 2007/0062119 A1 * | 3/2007 | Ritter .................... E05F 15/622 |
| | | 49/343 |
| 2009/0266672 A1 | 10/2009 | Scheck |
| 2011/0290050 A1 | 12/2011 | Kummer et al. |
| 2012/0193184 A1 * | 8/2012 | Chiang .................. F16D 27/01 |
| | | 192/66.1 |
| 2014/0000394 A1 * | 1/2014 | Anheier ................. F16H 25/20 |
| | | 74/89.29 |
| 2015/0211279 A1 * | 7/2015 | Suzuki ...................... E05F 3/16 |
| | | 16/65 |
| 2015/0300468 A1 | 10/2015 | Ritter et al. |
| 2017/0138107 A1 | 5/2017 | Müller et al. |
| 2018/0080532 A1 * | 3/2018 | Oster .................... E05F 15/622 |
| 2018/0371821 A1 | 12/2018 | Fees et al. |
| 2019/0323277 A1 | 10/2019 | Schmengler et al. |
| 2020/0024883 A1 * | 1/2020 | Scheuring ............. E05F 15/622 |
| 2020/0052550 A1 * | 2/2020 | Shimizu ................. F16H 25/20 |
| 2020/0165856 A1 * | 5/2020 | Scheuring ............... E05F 5/025 |
| 2020/0186005 A1 * | 6/2020 | Borgarelli ............. B64C 13/505 |
| 2020/0208698 A1 * | 7/2020 | Kim ........................ F16D 65/14 |
| 2020/0217118 A1 * | 7/2020 | Wirth .................. F16H 25/2454 |
| 2020/0308892 A1 * | 10/2020 | Kummer ................ F16H 25/20 |
| 2021/0018079 A1 * | 1/2021 | Winkler ................... F04B 9/02 |

* cited by examiner

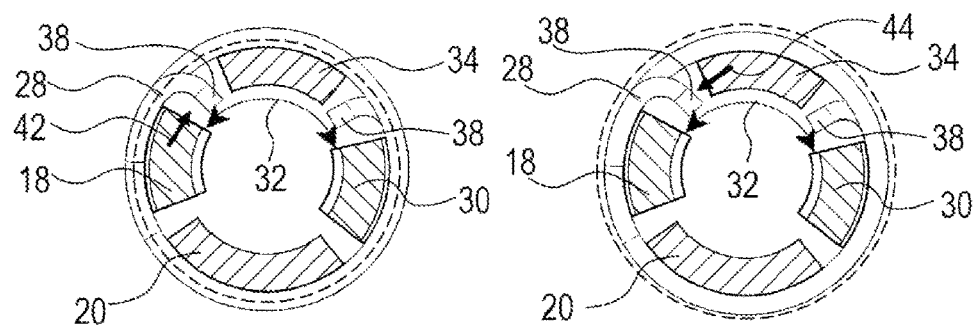
*FIG. 5A*  *FIG. 5B*
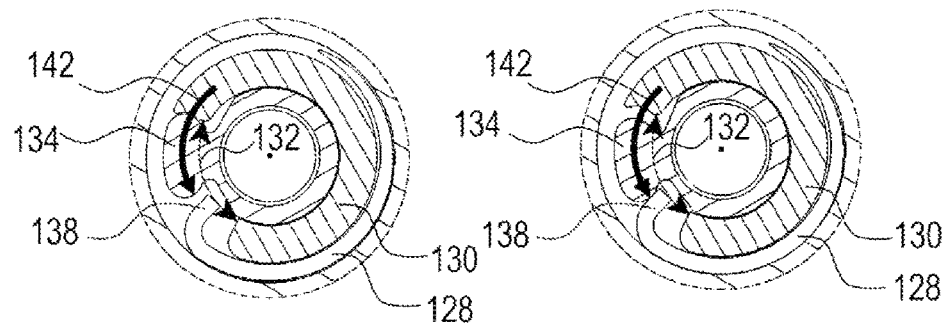
*FIG. 6A*  *FIG. 6B*
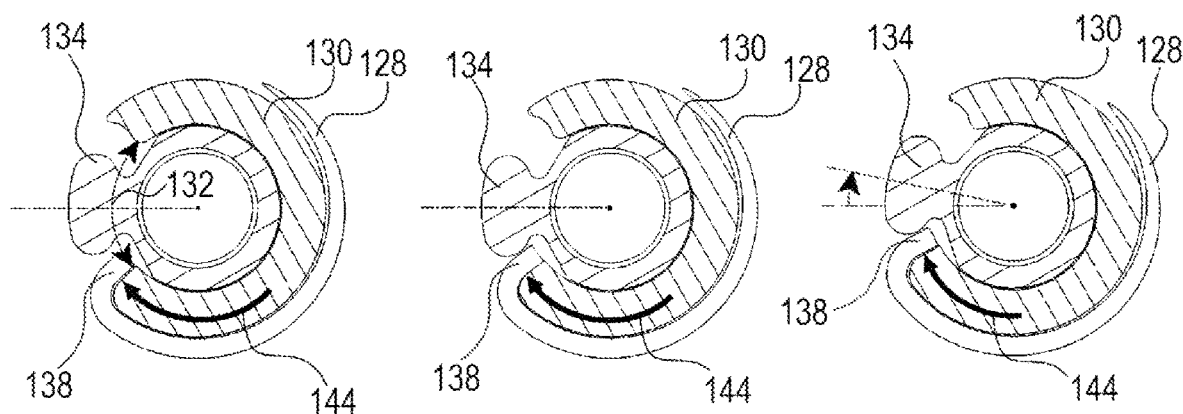
*FIG. 7A*  *FIG. 7B*  *FIG. 7C*

FRICTION BRAKE AND POWER STRUT THEREWITH

TECHNICAL FIELD

The present disclosure deals with a friction brake for automotive applications, for example power struts for lift gates or slider windows.

BACKGROUND

For power closures operated by powered spindle drives, such as lift gates, tailgates, or doors, it is desirable to hold the position of the moving part against inherent counter forces exerted by the weight of a liftgate for example. Linear actuator systems typically use a highly efficient planetary gearbox drive train. These systems are not able to meet forced-entry specification.

It is desirable to provide a power strut that is suited to hold a driven part against counter forces and to make linear actuator systems suitable for rear slider mechanisms to meet the forced-entry specifications.

SUMMARY

The present disclosure describes a friction brake assembly that comprises a brake housing; an input coupling element with a splined extension; an output coupling element with a splined extension; and a torsion spring. The input coupling element has an axial protrusion forming a partial cylinder wall with an angular gap over a defined angular range. The output coupling element has a projection protruding into the at least one angular gap, wherein the projection has an angular width smaller than the angular gap; wherein the torsion spring is a coil spring with coil ends forming two radially inward pins protruding into the angular gap in the input coupling element between the partial cylinder wall and the projection so that the projection is between the two inward pins. The torsion spring has a diameter that expands to form a friction lock with a surrounding cylindrical wall when the projection of the output coupling element engages and moves either one of the inward pins; and wherein the diameter of the torsion spring incurs at most such a loose contact with the cylindrical wall that the torsion spring rotates relative to the cylindrical wall when the input coupling element engages and moves either one of the inward pins.

In a first example, the cylindrical wall is part of a housing cylinder forming a portion of the brake housing.

In a second example, the cylindrical wall is part of a spring carrier coaxially disposed inside a housing cylinder forming a portion of the brake housing.

This permits the arrangement of a friction clutch acting between the spring carrier and the housing cylinder.

The friction clutch may, for example, comprise at least one annular friction disc surrounding the cylindrical wall and non-rotatably coupled to the spring carrier; at least one friction washer surrounding the cylindrical wall and non-rotatably coupled to the housing cylinder; and an annular compression spring axially biasing the at least one friction washer and the at least one annular friction disc against each other.

The arrangement permits a free rotation when a torque is applied from the side of the input coupling element, but not when a torque is applied from the output coupling member.

A power strut incorporating the friction brake includes a strut housing; the friction brake according to one of the examples; a threaded spindle connected to the output coupling element; and a motor-transmission arrangement coupled to the input coupling element;

wherein the brake housing is fixedly fastened to the strut housing.

Further details and benefits of the present disclosure will become apparent from the following description of various examples illustrated in the appended drawings. The drawings are provided herewith for purely illustrative purposes and are not intended to limit the scope of the present invention.

BRIEF DESCRIPTION OF THE DRAWINGS

In the drawings,

FIG. 5A schematically shows a disengagement of the friction brake of FIGS. 1-4;

FIG. 5B schematically shows an engagement of the friction brake of FIGS. 1-4;

FIGS. 6A and 6B schematically show an engagement of a friction brake of a second example of a friction brake according to the present disclosure;

FIGS. 7A, 7B, and 7C schematically show a disengagement of the friction brake of the second example;

DETAILED DESCRIPTION OF THE DRAWINGS

Figure 1:
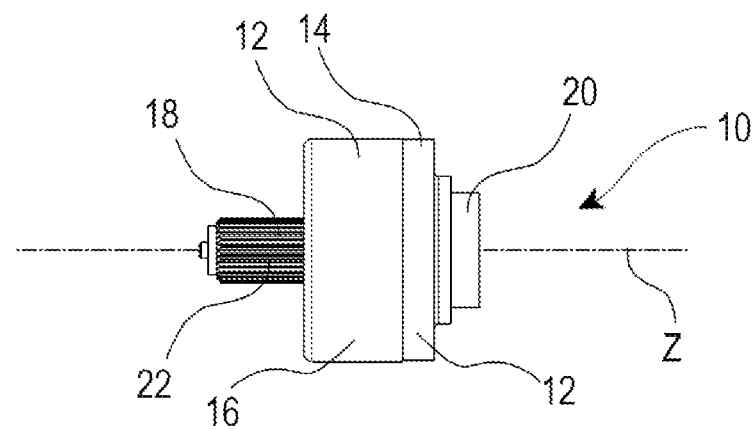
FIG. 1 shows a radial view of a first example of a friction brake according to the present disclosure.
Figure 2:
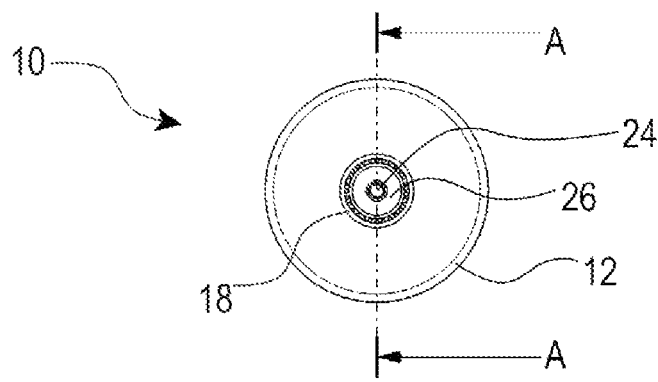
FIG. 2 shows an axial view of the friction brake of FIG. 1.
Figure 3:
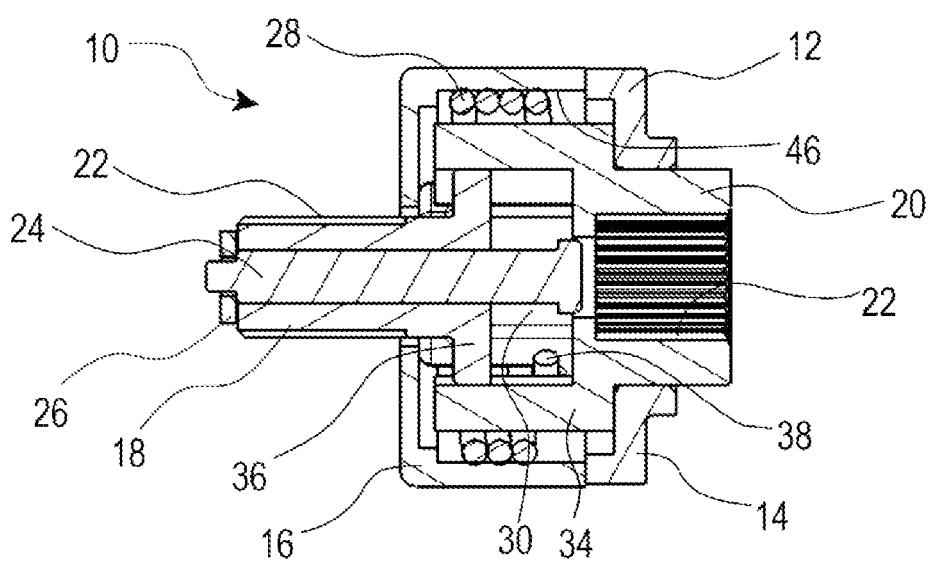
FIG. 3 shows a cross-sectional view of the friction brake of FIGS. 1 and 2 along the line A-A indicated in FIG. 2.
Figure 4:
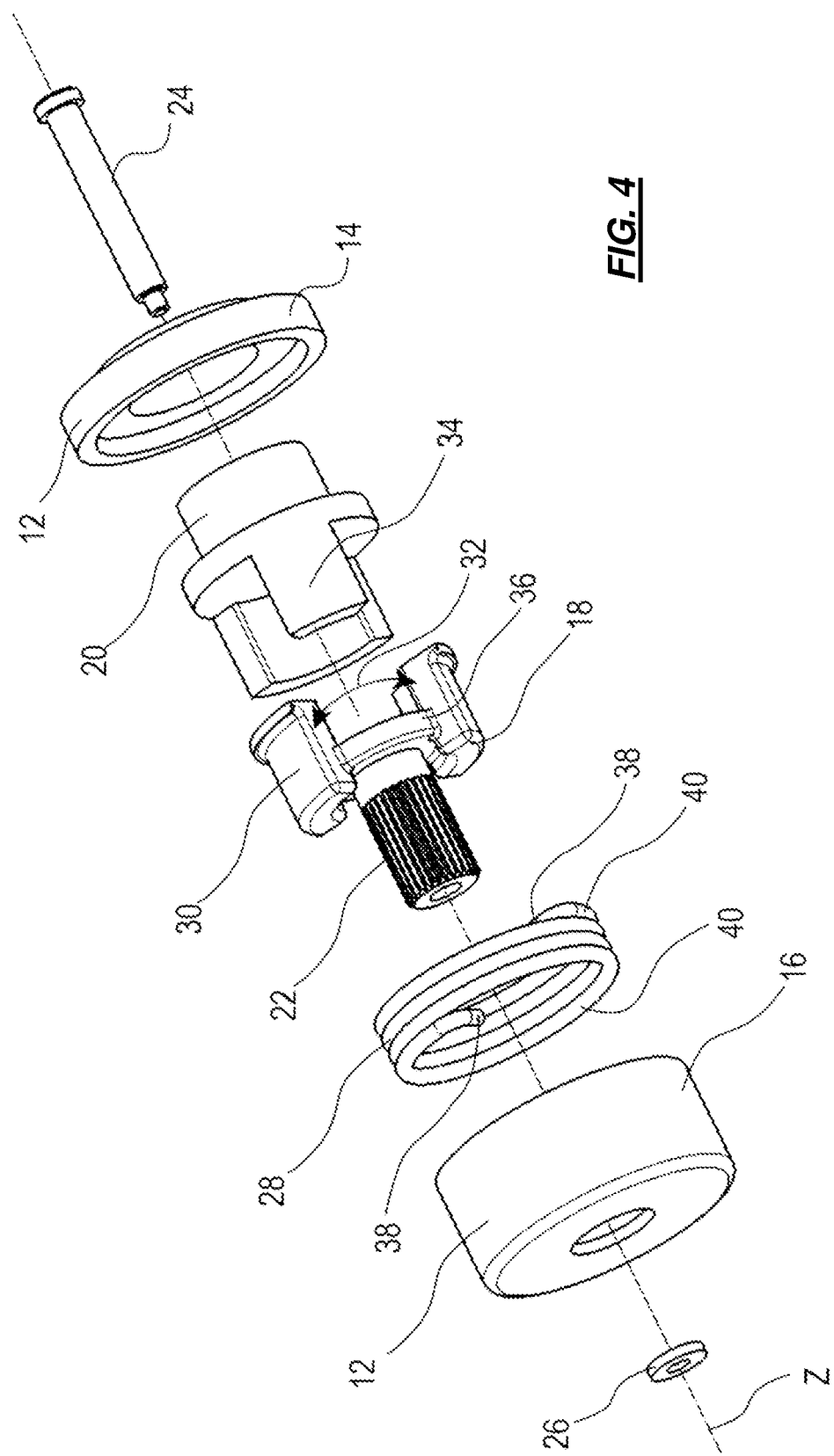
FIG. 4 shows an exploded view of the friction brake of FIGS. 1-3.
Figure 8:
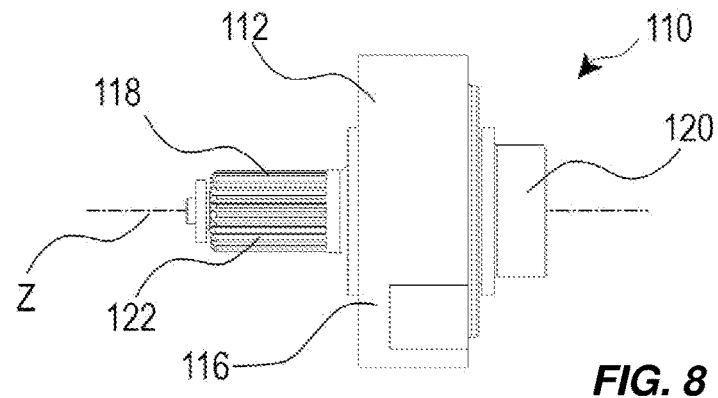
FIG. 8 shows a radial view of the second example of the friction brake according to the present disclosure, with an added friction clutch.
Figure 9:
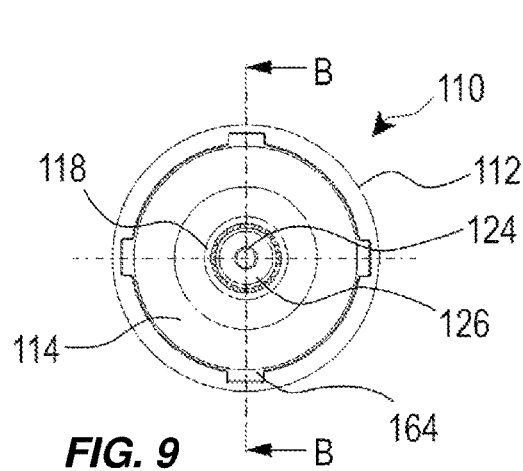
FIG. 9 shows an axial view of the friction brake of FIG. 8.
Figure 11:
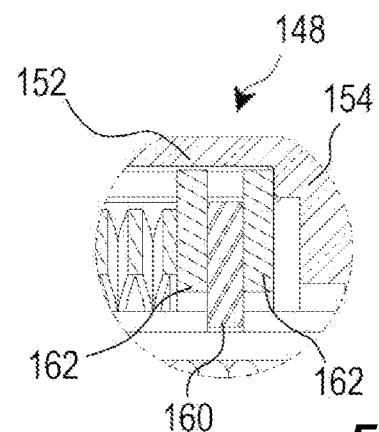
FIG. 11 shows a partial detail view of FIG. 10.
Figure 10:
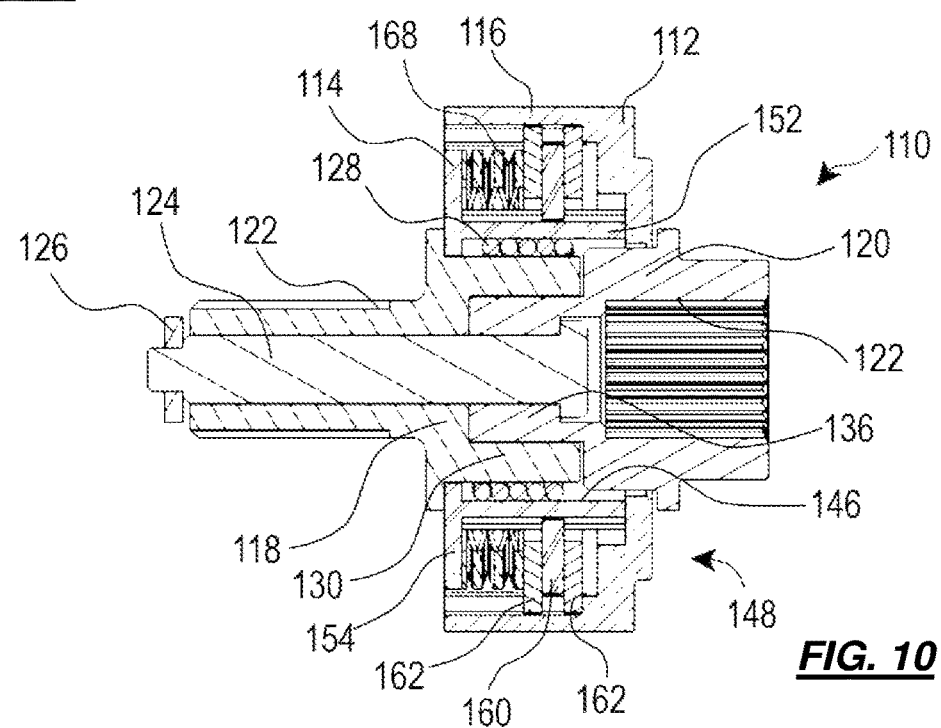
FIG. 10 shows a cross-sectional view of the friction brake of FIGS. 8 and 9 along the line B-B indicated in FIG. 2.

FIGS. 1-4 illustrate a first example of a friction brake 10 of the present disclosure. With reference to FIGS. 1-3, the friction brake 10 is disposed in a brake housing 12 with an end cap 14 and a housing cylinder 16 surrounding an input coupling element 18 and an output coupling element 20. Each of the input coupling element 18 and output coupling element 20 includes a splined extension 22. In the example shown, the input coupling element 18 has an external spline, while the output coupling element 20 has an internal spline. The brake housing 12 is non-rotatably secured to an external location, while the input coupling element 18 and the output coupling element 20 are rotatable relative to the brake housing 12 about an axis of rotation Z. Any relative rotation between the input coupling element 18 and the output coupling element 20 is limited to an angle of at most a quarter rotation, preferably less, for example between 5 and 20 degrees.

The input coupling element 18 and the output coupling element 20 are axially coupled to each other by a central axial pin 24 secured with a washer 26. The axial pin 24 is rotatable relative to the input coupling element 18 and to the output coupling element 20.

A torsion spring 28 surrounds an axial portion where the input coupling element 18 and the output coupling element 20 mesh with alternating axial protrusions 30 and 34 arranged along the periphery. This detail is best visible in the exploded view of FIG. 4. The input coupling element 18 has at least one axial protrusion shaped like a partial cylinder wall 30, leaving at least one angular gap 32 over a defined angular range. In the shown embodiment, the input coupling element 18 has two angular gaps 32. The output coupling element 20 includes at least one projection 34 protruding into the at least one angular gap 32. In the shown example, the projection 34 of the output coupling element 20 is an axial projection 34 extending over a smaller angular range than the angular gap 32 of the input coupling element 18. The input coupling element 18 has a center portion 36 axially inserted into the axial space surrounded by the axial projections 34 of the output coupling element 20. The output coupling element 20 and the input coupling element 18 are thus axially meshed, and the torsion spring 28 surrounds the overlapping portions.

The torsion spring 28 is a coil torsion spring with coil ends forming two radially inward pins 38. These two inward pins 38 protrude into one of the angular gaps 32 in the input coupling element 18 between the partial cylinder wall 30 and the projection 34 so that the projection 34 is located between the two pins 38

The angular widths of the angular gap 32, of the projection 34, and of the inward pin 38 respectively associated with each other are dimensioned to allow for a limited relative rotation between the input coupling element 18 and the output coupling element 20.

In the shown example, as best seen in the schematic illustration of FIGS. 5A and 5B, the input coupling element 18 has two angular gaps 32 and the output coupling element 20 has two projections 34. The torsion spring 28 is wound in a manner that the end windings 40 overlap by more than 180 degrees and less than 350 degrees, and the inward pins 38 extend into the same angular gap 32 of the input coupling element 18. One of the projections 34 of the output coupling element 20 extends into the angular gap 32 receiving the inward pins 38 and is disposed between the two inward pins 38. The width of the angular gap 32 is greater than the distance between the two inward pins 38. And the projection 34 is narrower than the distance between the inward pins 38. The other radial gap 32 and projection 34 may provide an additional abutment limiting a relative rotation between the input coupling element 18 and the output coupling element 20, but these additional meshing portions are not essential for the general function of the friction brake 10.

FIG. 5A illustrates how a torque applied from by the input coupling element 18, indicated by an arrow 42, causes the partial cylinder wall 30 to engage one of the inward pins 38 and to reduce the distance between the two inward pins 38. This movement causes the torsion spring 28 to contract and to reduce its diameter, and indicated by a broken circle. As a result, the torsion spring 28 remains movable relative to the surrounding internal cylindrical wall 46 of the housing cylinder 16. The input coupling element 18 and the torsion spring 28 remain rotatable relative to the surrounding cylindrical wall 46 and eventually abut at least one of the projections 34 of the output coupling element 20, which follows the rotation. While the torsion spring 28 may still be in loose contact with the surrounding internal cylindrical wall 46, this contact does not generate any significant friction so that the torsion spring 28 rotates with the input coupling element 18. This effect is symmetrical and operates in analogy for a counterclockwise rotation as for the shown clockwise rotation originating from the input coupling element 18.

FIG. 5B illustrates a situation, in which a torque is applied by the output coupling element 20, for example due to a counter force of a part coupled to the output coupling element 20, as indicated by an arrow 44. In this situation, the projection 34 of the output coupling element 20 is rotated to abut one of the inward pins 38. The inward pin 38 is moved in a direction away from the other pin 38, thereby expanding the diameter of the torsion spring 28 as indicated by a broken line. As a result, the outer circumference of the torsion spring 28 engages in a friction lock with the surrounding cylindrical wall 46 and blocks a further rotation of the output coupling element 20. Accordingly, the output coupling element 20 is unable to rotate the input coupling element 18 relative to the surrounding cylindrical wall 46. Again, this effect is symmetrical and operates in analogy for a clockwise rotation as for the shown counterclockwise rotation originating from the output coupling element 20.

In the shown first example, the surrounding cylindrical wall 46 is a surface of the housing cylinder 16 that is non-rotatably mounted to a location or part outside of the friction brake 10.

FIGS. 6A through 7C illustrate this functionality on a modified arrangement of a second example of a friction brake 110 and will be discussed below.

The complete assembly of this second example is shown in FIGS. 8 through 13. In this example, a friction brake 110 is supplemented with a friction clutch 148 that, once the friction brake 110 engages, allows a damped rotation of the output coupling element 120 and the input coupling element 118 relative to the brake housing 112.

The friction brake 110 is disposed in the brake housing 112 with a housing cylinder 116 surrounding an input coupling element 118 and an output coupling element 120. Each of the input coupling element 118 and output coupling element 120 includes a splined extension 122. In the example shown, the input coupling element 118 has an external spline, while the output coupling element 120 has an internal spline. The brake housing 112 is non-rotatably secured to an external location, while the input coupling element 118 and the output coupling element 120 are rotatable relative to the brake housing 112 about an axis of rotation Z. Any relative rotation between the input coupling element 118 and the output coupling element 120 is limited to an angle of at most a quarter rotation, preferably less, for example between 5 and 20 degrees.

The input coupling element 118 and the output coupling element 120 are axially coupled to each other by a central axial pin 124 secured with a washer 126. The axial pin 124 is rotatable relative to the input coupling element 118 and to the output coupling element 120.

A torsion spring 128 surrounds an axial portion where the input coupling element 118 and the output coupling element 120 mesh along the periphery. This detail is best visible in the partial cut-away view of FIG. 13. The input coupling element 118 of this example has one axial protrusion shaped like a partial cylinder wall 130, leaving an angular gap 132 over a defined angular range. In the shown embodiment, the angular gap 132 of the input coupling element 118 has additional narrow recesses 150 for accommodating the inward bent pins 138 of the torsion spring 128, i.e. one recess 150 at each axial end of the angular gap 132 when actuated by the output coupling element 120. The output coupling element 120 has a center portion 136 axially inserted into the axial space surrounded by the partial cylinder wall 130 of the input coupling element 118. Radially outward from the center portion 136, the output coupling element 120 includes a projection 134 protruding into the angular gap 132. In the shown example, the projection 134 of the output coupling element 120 is radial lobe extending over a smaller angular range than the angular gap 132 of the input coupling element 118. The output coupling element 120 is axially mated with the input coupling element 118, and the torsion spring 128 surrounds the overlapping portions.

As in the first example, the torsion spring 128 of the second example is a coil torsion spring 128 with coil ends forming two radially inward pins 138. The torsion spring 128 is wound in a manner that the end windings 140 overlap by more than 180 degrees and less than 350 degrees, and the inward pins 138 extend into the angular gap 132 in the input coupling element 118 between the partial cylinder wall 130 and the projection 134 so that the projection 134 is between the two inward pins 138.

The angular widths of the angular gap 132, of the recesses, of the projection 134, and of the inward pins 138 are dimensioned to allow for a limited relative rotation between the input coupling element 118 and the output coupling element 120.

Figures 12, 13:
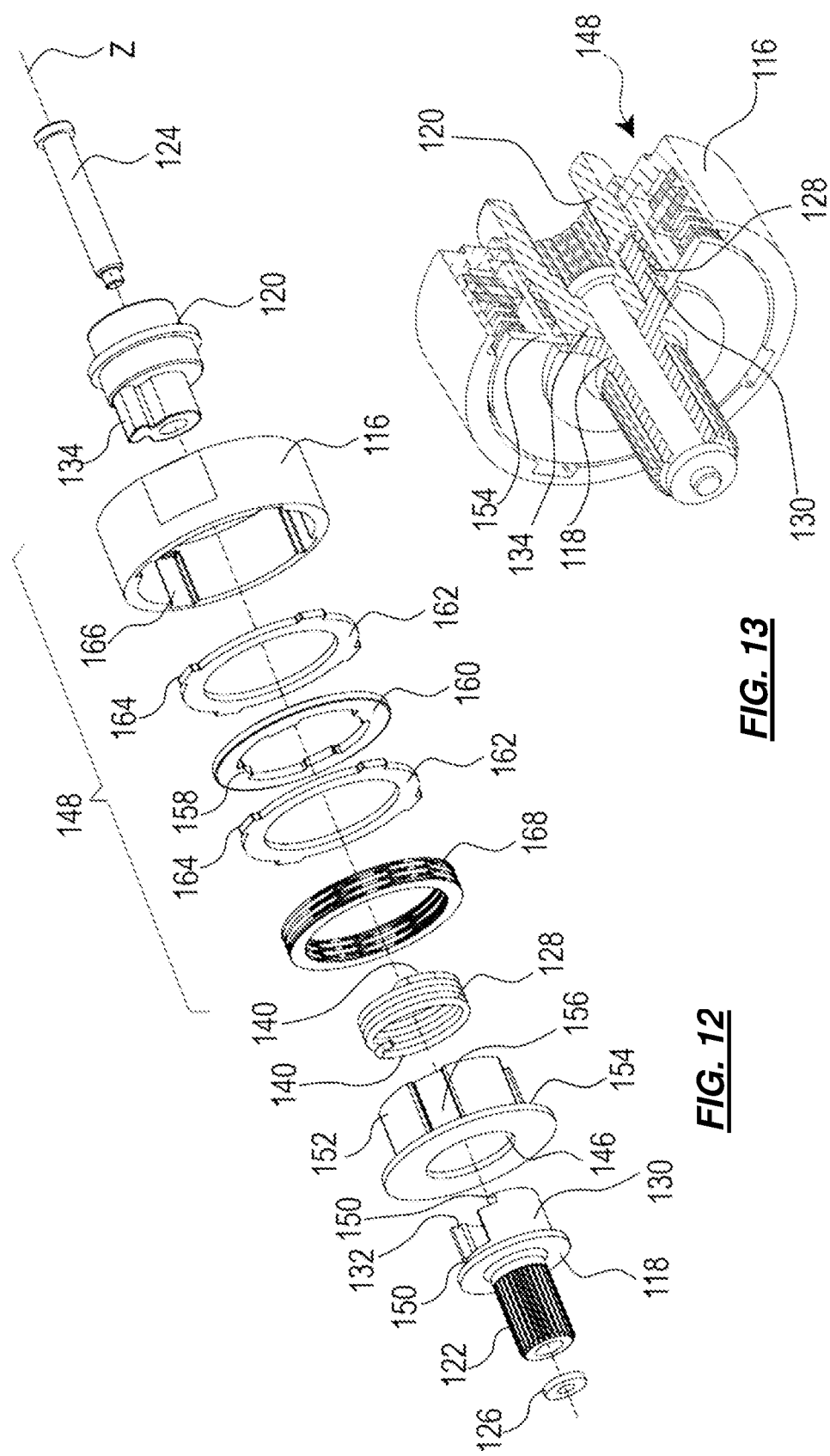
FIG. 12 shows an exploded view of the example of FIG. 8.
FIG. 13 shows a cut-away perspective view of the example of FIG. 8.

In contrast to the first embodiment, however, the torsion spring 128 is not adapted to make contact with the housing cylinder 116, but with a cylindrical portion 152 of a spring carrier 154. The spring carrier 154 further has a radially extending annular portion 114 serving as an end cap for the housing cylinder 116. As best seen in FIG. 12, the cylindrical portion 152 of the spring carrier 154 has external axially extending grooves 156 for meshing with internal tabs 158 of an annular friction disc 160 such that the friction disc 160 is axially slidable, but not rotatable relative to the spring carrier 154. This friction disc 160 is sandwiched between two friction washers 162 having external tabs 164 meshing with axial grooves 166 on the inside of the housing cylinder 116. The friction washers 162 are axially slidable, but not rotatable relative to the housing cylinder 116. The friction washers 162 and the friction disc 160 are compressed by an annular compression spring 168 disposed on the spring carrier 154 between the radially extending annular portion and the adjacent friction washer 162. The other friction washer 162 axially abuts a step in the housing cylinder 116. In the shown example, the compression spring 168 is shown as a wave spring, but any compression spring would be suitable, preferably selected for a small axial length. Other suitable compression springs may consist of Belleville washers in stacked alternating orientations.

The assembly of the spring carrier 154, the compression spring 168, the friction disc 160, the friction washers 162, and the housing cylinder 116 forms the friction clutch 148 that allows for a relative rotation between the spring carrier 154 and the housing cylinder 116, but such a rotation is significantly slowed down due to the friction force between the friction washers 162 and the friction disc 160. Accordingly, when the friction clutch 148 is engaged, a given torque will result in a much smaller rotational speed than when the friction clutch 148 is disengaged.

FIGS. 6A and 6B illustrate a situation, in which a torque is applied by the output coupling element 120, for example due to a counter force of a part coupled to the output coupling element 120, as indicated by an arrow 142. In this situation, the projection 134 of the output coupling element 120 is rotated to abut one of the inward pins 138. The inward pin 138 is moved in a direction away from the other pin 138 (behind the image plane and not shown), thereby expanding the diameter of the torsion spring 128. As a result, the outer circumference of the torsion spring 128 engages in a friction lock with the surrounding cylindrical wall 146 of the spring carrier 154 and blocks a further rotation of the output coupling element 120 relative to the spring carrier 154. Accordingly, the output coupling element 120 is unable to rotate the input coupling element 118 relative to the spring carrier 154. Because the output coupling element 120 is now friction-locked with the spring carrier 154, the spring carrier 154 is urged by the output coupling element 120 to rotate relative to the housing cylinder 116, which is non-rotatably fixed to an external structure. It is thus the expansion of the torsion spring 128 diameter that engages the friction clutch 148. This effect is symmetrical and operates in analogy for a clockwise rotation as for the shown counterclockwise rotation originating from the output coupling element 120.

FIGS. 7A through 7C how a torque applied from by the input coupling element 118, indicated by an arrow 144, causes the partial cylinder wall 130 to engage one of the inward pins 138 and to reduce the distance between the two inward pins 138. This movement causes the torsion spring 128 to contract and to reduce its diameter, and indicated by a broken circle. As a result, the torsion spring 128 remains movable relative to the surrounding internal cylindrical wall 146 of the of the spring carrier 154 so that the friction clutch 148 remains disengaged. The input coupling element 118 and the torsion spring 128 remain rotatable relative to the surrounding cylindrical wall 146 and eventually abut the projection 134 of the output coupling element 120, which follows the rotation. While the torsion spring 128 may still be in contact with the surrounding internal cylindrical wall 146, this contact does not generate any significant friction so that the torsion spring rotates with the input coupling element 118. This effect is symmetrical and operates in analogy for a counterclockwise rotation as for the shown clockwise rotation originating from the input coupling element 118.

Figure 14:
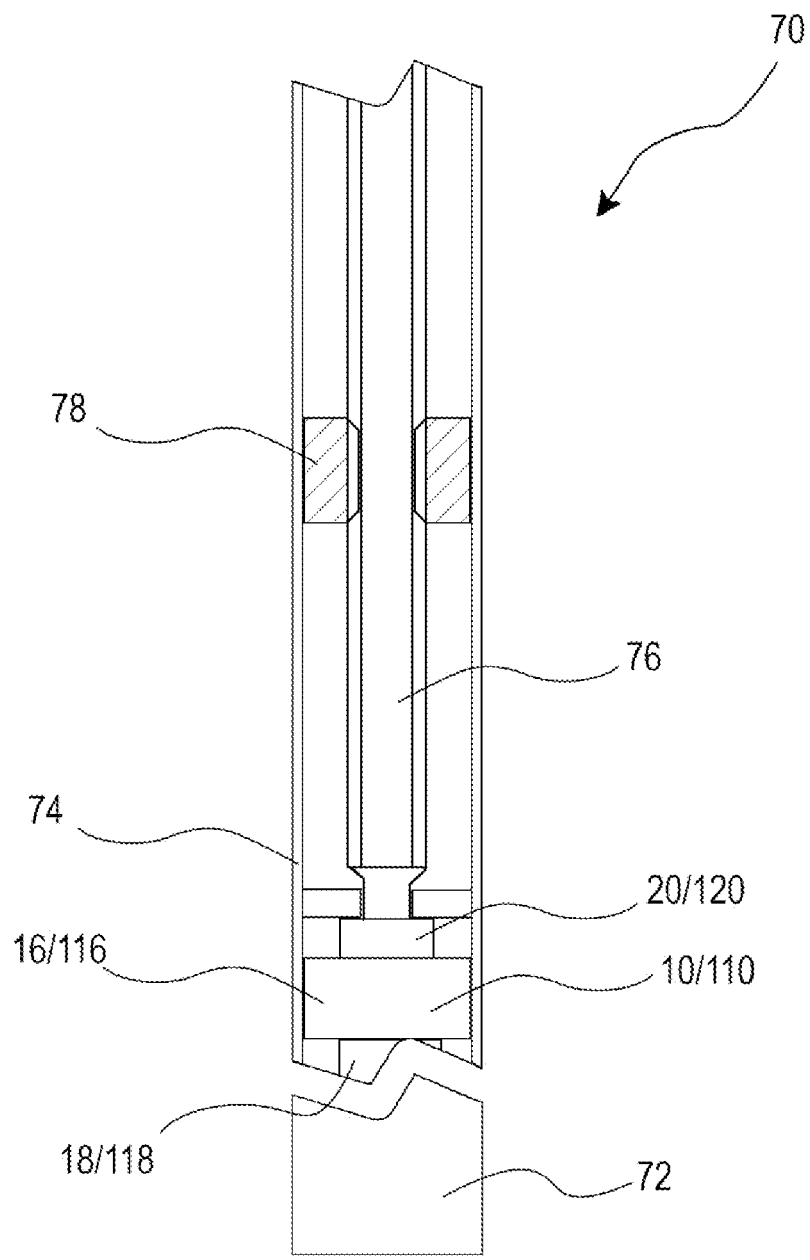
FIG. 14 is a schematic illustration of a power strut incorporating of a friction brake according to the first or second example of the present disclosure.

FIG. 14 provides a schematic illustration of a power strut 70 incorporating the friction brake 10 or 110 with or without the friction clutch 148, according to the first example or the second example. The housing cylinder 16 or 116 of the friction brake 10 or 110 is fixedly mounted inside the strut housing. In FIG. 14, the input coupling element 18 or 118 is connected to a motor and transmission arrangement 72 supplying a driving torque. The motor and transmission arrangement 72 may be rigidly coupled to the strut housing 74 of the power strut 70. Alternatively, a flexible shaft may be used to meet limited space requirements so that the motor and transmission arrangement 72 can be installed remote from the power strut 70.

The output coupling element 20 or 120 is coupled to a threaded spindle 76, on which a spindle nut 78 is disposed. The spindle nut 78 is non-rotatably guided in the strut housing 74 and thus travels along the spindle 76 when the spindle 76 rotates. The spindle nut 78 may be connected in a known manner to an inner cylinder for telescopic expansion or, through a longitudinal slot in the strut housing 74, to an external slidable part for effecting a linear movement upon rotation of the spindle 76.

In this arrangement, the function of the friction brake 10 or 110 with or without the friction clutch 148 is to allow an unimpeded rotation of the input coupling element 18 or 118 and the output coupling element 20 or 120 when torque is applied by the motor. If, however, a torque is applied from the side of the spindle 76, the friction brake 10 or 110 engages and prevents or slows down the rotation caused by this torque.

Notably, the friction brake 10 of the first example may be implemented with a friction clutch 148 as shown in the second example. Conversely, the friction brake 110 of the second example may be implemented without a friction clutch 148 in analogy to the first example.

While the above description constitutes the preferred embodiments of the present invention, the invention is susceptible to modification, variation and change without departing from the proper scope and fair meaning of the accompanying claims.

What is claimed is:

1. A friction brake assembly comprising:
   a brake housing;
   an input coupling element with a splined extension;
   an output coupling element with a splined extension; and
   a torsion spring;
   wherein the input coupling element has an axial protrusion forming a partial cylinder wall with an angular gap over a defined angular range;
   wherein the output coupling element has a projection protruding into the at least one angular gap, wherein the projection has an angular width smaller than the angular gap;
   wherein the torsion spring is a coil spring with coil ends forming two radially inward pins protruding into the angular gap in the input coupling element between the partial cylinder wall and the projection so that the projection is between the two inward pins;
   wherein the angular gap, the projection, and the inward pins have angular widths that are dimensioned to allow for a limited relative rotation between the input coupling element and the output coupling element and wherein the pins have a relaxed position at a distance from each other that is smaller than the width of the angular gap and greater than the width of the projection.

2. The friction brake assembly of claim 1, wherein the torsion spring has end windings overlapping by more than 180 degrees and less than 350 degrees.

3. The friction brake assembly of claim 1, further comprising a cylindrical wall surrounding the torsion spring,
   wherein the torsion spring has a diameter that expands to form a friction lock with the cylindrical wall when the projection of the output coupling element engages and moves either one of the inward pins; and
   wherein the diameter of the torsion spring is at most in loose contact with the cylindrical wall so that the torsion spring rotates relative to the cylindrical wall when the input coupling element engages and moves either one of the inward pins.

4. The friction brake assembly of claim 3, wherein the cylindrical wall is part of a housing cylinder forming a portion of the brake housing.

5. The friction brake assembly of claim 3, wherein the cylindrical wall is part of a spring carrier coaxially disposed inside a housing cylinder forming a portion of the brake housing.

6. The friction brake assembly of claim 5, further comprising a friction clutch acting between the spring carrier and the housing cylinder.

7. The friction brake assembly of claim 6, wherein the friction clutch comprises:
   at least one annular friction disc surrounding the cylindrical wall and non-rotatably coupled to the spring carrier;
   at least one friction washer surrounding the cylindrical wall and non-rotatably coupled to the housing cylinder; and
   an annular compression spring axially biasing the at least one friction washer and the at least one annular friction disc against each other.

8. The friction brake assembly of claim 7, wherein the compression spring is a wave spring.

9. The friction brake assembly of claim 7, wherein the at least one annular friction disc has internal tabs meshing with axial grooves on an outside surface of the cylindrical wall of the spring carrier such that the at least one annular friction disc is axially slidable, but not rotatable relative to the spring carrier.

10. The friction brake assembly of claim 7, wherein at least one friction washer has external tabs meshing with axial grooves on an inside surface of the housing cylinder such that the friction washers are axially slidable, but not rotatable relative to the housing cylinder.

11. The friction brake of claim 1, wherein the splined extension of the input coupling element has an external spline and the splined connection of the output coupling element has an internal spline.

12. A power strut comprising:
    a strut housing;
    the friction brake assembly of claim 1;
    a threaded spindle connected to the output coupling element; and
    a motor-transmission arrangement coupled to the input coupling element;
    wherein the brake housing is fixedly fastened to the strut housing.

13. The power strut of claim 12, further comprising a cylindrical wall surrounding the torsion spring,
    wherein the torsion spring has a diameter that expands to form a friction lock with the cylindrical wall when the spindle applies a torque to the output coupling element; and
    wherein the diameter of the torsion spring is at most in loose contact with the cylindrical wall so that the torsion spring rotates relative to the cylindrical wall when the input coupling element engages and moves either one of the inward pins.

14. The power strut of claim 13, wherein the cylindrical wall is part of a housing cylinder forming a portion of the brake housing.

15. The power strut of claim 13, wherein the cylindrical wall is part of a spring carrier coaxially disposed inside a housing cylinder forming a portion of the brake housing.

16. The power strut of claim 15, further comprising a friction clutch acting between the spring carrier and the housing cylinder.

17. The power strut of claim 16, wherein the friction clutch comprises:
    at least one annular friction disc surrounding the cylindrical wall and non-rotatably coupled to the spring carrier;
    at least one friction washer surrounding the cylindrical wall and non-rotatably coupled to the housing cylinder; and
    and an annular compression spring axially biasing the at least one friction washer and the at least one annular friction disc against each other.

* * * * *